United States Patent [19]

O'Brien

[11] Patent Number: 4,579,902
[45] Date of Patent: Apr. 1, 1986

[54] PERMANENTLY ANTISTATIC THERMOPLASTIC MOLDING COMPOSITION

[75] Inventor: David P. O'Brien, Plainfield, N.J.

[73] Assignee: Celanese Corporation, New York, N.Y.

[21] Appl. No.: 678,441

[22] Filed: Dec. 5, 1984

[51] Int. Cl.[4] .................... C08K 3/24; C08K 5/03; C08K 5/06; C08L 67/02
[52] U.S. Cl. .................... 524/496; 260/DIG. 16; 260/DIG. 17; 260/DIG. 19; 524/513; 524/605; 524/910
[58] Field of Search .............. 524/496, 605, 513, 910; 260/DIG. 16, DIG. 17, DIG. 19

[56] References Cited

U.S. PATENT DOCUMENTS

| | | | |
|---|---|---|---|
| 3,971,752 | 7/1976 | Aoyama et al. | 524/371 |
| 4,010,219 | 3/1977 | Aoyama et al. | 524/371 |
| 4,052,356 | 10/1977 | Breitenfellner et al. | 524/605 |
| 4,107,231 | 8/1978 | Wurmb et al. | 525/437 |
| 4,191,678 | 3/1980 | Smith | 524/371 |
| 4,242,473 | 12/1980 | Nametz et al. | 524/605 |
| 4,491,536 | 1/1985 | Tomoda et al. | 524/496 |

FOREIGN PATENT DOCUMENTS 57-200463 12/1982 Japan ................... 524/513

OTHER PUBLICATIONS

Fowler et al, "Formulating Cost-Effective Conductive Compositions," *Plastics Engineering;* Jun. 1981, pp. 29–32.
Davenport, "Metalloplastics–High Cnductivity Materials," *Conductive Polymers,* Polymer Science and Technology Series, vol. 15, edited by Raymond B. Seymour, 1981.

*Primary Examiner*—Ronald W. Griffin
*Attorney, Agent, or Firm*—Robert M. Shaw

[57] ABSTRACT

The present invention provides a permanently antistatic, injection moldable thermoplastic composition comprising a polybutylene terephthalate resin having an intrinsic viscosity in the range of about 0.7 to about 1.4 deciliters per gram measured in ortho-chlorophenol at 25° C., an antistatic dopant comprising an electron acceptor compound, an electron donor compound, and polytetrafluoroethylene, and less than about 10 percent by weight based on the total weight of the molding composition of carbon fibers having lengths between about 0.1 and about 1.0 inch. Such a molding composition exhibits a volume resistivity of less than $1 \times 10^8$ ohm-cm, exceptional low wear performance, excellent mechanical properties, and ease of manufacture.

28 Claims, No Drawings

PERMANENTLY ANTISTATIC THERMOPLASTIC MOLDING COMPOSITION

BACKGROUND OF THE INVENTION

The present invention provides a permanently antistatic, low wear, thermoplastic molding composition comprising a polybutylene terephthalate resin having an intrinsic viscosity in the range of about 0.7 to about 1.4 deciliters per gram measured in ortho-chlorophenol at 25° C., an antistatic dopant comprising an electron acceptor compound, an electron donor compound, and polytetrafluoroethylene, and less than about 10 percent by weight based on the total weight of the molding composition of carbon fibers having lengths between about 0.1 and about 1.0 inch. Such a molding composition is permanently antistatic, easily made, and exhibits exceptional low wear performance, flame resistance, mechanical properties, and cost effectiveness.

Polybutylene terephthalate (PBT) resins have become widely utilized in industrial molding applications. Unlike polyethylene terephthalate, PBT resins are injection moldable at relatively low molding temperatures to form stable molded articles. Furthermore, the high rate of crystallization of PBT resins, even at the relatively low molding temperatures, greatly facilitates the mold release of articles molded from PBT resins. Articles molded from PBT resins are known to have good chemical resistance, low water absorption, and good mechanical properties.

However, PBT resins exhibit a marked tendency to become charged with static electricity. The highly electrified surfaces of articles molded from PBT resins are known to be extremely hazardous if such articles come into contact with flammable or explosive materials. Thus, the material handling industry has had a long-felt need for cost effective, low wear thermoplastics that have sufficient electrical conductivity so as to prevent the buildup of a static electric charge on material handling equipment such as moving conveyor parts. Conveyor applications that involve the movement of flammable or explosive material or sensitive electronic circuitry simply cannot tolerate the safety hazards inherent with the accumulation of a static electric charge on conveyor components. Current federal standards and technology indicates that a volume resistivity of less than $10^8$ ohm-cm is necessary to alleviate the problems associated with the aforedescribed buildup of static electricity.

It is known that the addition to molding compositions of carbon fibers in concentrations of 10 to 40 percent by weight of the total weight of the molding composition, improves the electrical conductivity of the compositions.

However, due to the cost of carbon fibers, such compositions are prohibitively expensive. Also, it is difficult to melt compound such compositions by extrusion or other melt compounding techniques. Such difficulty results in a non-uniform dispersion of carbon fiber in the resin matrix, poor processability, poor uniformity of properties such as highly variable mechanical properties, and poor fiber strength and modulus translation in the composite. The poor processability of these conventional compositions is due to their lack of homogeneity and high fiber content.

U.S. Pat. No. 4,024,204 discloses PBT molding compositions containing from 0.5 to 20% by weight, based on the PBT, of an alkoxylated polyamide finely distributed therein to reduce the tendency of the PBT to electrification.

U.S. Pat. No. 4,148,960 discloses a process for the production of shaped objects such as films, fibers, and fabrics, from a polymeric composition having improved antistatic properties. The composition comprises a melt blend of a polyester and a block terpolymer selected from the group consisting of lactam-polyolpolyacyl lactam and lactam-polyolacylpolylactam.

U.S. Pat. No. 3,462,185 discloses an antistatic polyester composition comprising a polyethylene terephthalate based polyester and a phosphorous acid triester derivative therein containing a polyalkylene oxide chain in the molecule.

G.B. Pat. No. 1,228,573 discloses a material which comprises 80 percent by weight of lengths of reinforcing carbon filaments and 20 percent by weight of filaments or films of thermoplastic material wherein the filaments and/or films have been coalesced together under the influence of heat and pressure.

U.S. Pat. Nos. 4,369,280, 4,373,067, 4,283,326, 4,195,011, and 4,107,231 all disclose compositions comprising inter alia a polyester resin, carbon fibers, and various flame retardant additives.

According to the present invention, a cost effective, easily processed, thermoplastic molding composition that exhibits excellent low wear performance, flame resistance, and mechanical properties, comprises a PBT resin, an antistatic dopant comprising an electron acceptor compound, an electron donor compound, and polytetrafluoroethylene, and less than about 10 percent by weight of the total composition of carbon fibers having lengths between about 0.1 and 1.0 inch, is permanently antistatic in that the composition is characterized by a volume resistivity of less than $1 \times 10^8$ ohm-cm.

Therefore, it is an object of the present invention to provide a thermoplastic molding composition that exhibits a volume resistivity of less than $1 \times 10^8$ ohm-cm.

It is an object of the present invention to provide a permanently antistatic thermoplastic molding composition suitable for use in handling flammable or explosive materials or sensitive electronic circuitry.

It is a further object of the present invention to provide a relatively low cost permanently antistatic thermoplastic molding composition.

It is also an object of the present invention to provide a relatively low cost, permanently antistatic thermoplastic molding composition that exhibits exceptional wear performance, flame resistence, and mechanical properties.

It is a further object of the present invention to provide a thermoplastic molding composition suitable for handling material that cannot tolerate the buildup of a static electric charge on the handling equipment.

It is also an object of the present invention to provide a relatively low cost, permanently antistatic thermoplastic molding composition with good processability, i.e., ease of injection molding into complex shapes.

SUMMARY OF THE INVENTION

The permanently antistatic, thermoplastic molding composition of the present invention comprises an intimate blend of:

(a) from about 52 to about 90 percent by weight based on the total weight of the molding composition of a polybutylene terephthalate resin having an intrinsic viscosity in the range of from about 0.7 to about 1.4 deciliters per gram measured in ortho-chlorophenol at 25° C.;

(b) from about 6 to about 38 percent by weight based on the total weight of said molding composition of an antistatic dopant comprising:
  (i) an electron acceptor compound present in an amount of from about 2 to about 12 percent by weight of the total weight of the molding composition;
  (ii) an electron donor compound present in an amount of from about 4 to about 24 percent by weight of the total weight of the molding composition; and
  (iii) from about 0.1 to about 2.0 percent by weight based on the total weight of the molding composition of polytetrafluoroethylene resin; and (c) from about 4 to less than about 10 percent by weight based on the total weight of the molding composition of carbon fibers having lengths between about 0.1 and about 1.0 inch; wherein the molding composition has a volume resistivity of less than $1 \times 10^8$ ohm-cm.

DETAILED DESCRIPTION OF PREFERED EMBODIMENTS

Polybutylene Terephthalate Resins

The polybutylene terephthalate (PBT) resins of the thermoplastic molding compositions of the present invention may be produced in any suitable manner, such as by reacting terephthalic acid of a dialkyl ester of terephthalic acid, such as dimethyl terephthalate, with diols having four carbon atoms. Suitable diols include 1,4-butanediol, 1,3-butanediol, 1,2-butanediol, and 2,3-butanediol. PBT for use in the present invention has an intrinsic viscosity (I.V.) in the range of from about 0.7 to about 1.4, preferably from about 0.8 to about 1.1, and most preferably from about 0.9 to about 1.0 deciliters per gram as measured in ortho-chlorophenol at 25° C. and at a PBT concentration of about 8% by weight. The manufacture of PBT is well known to those skilled in the art, as are various techniques for obtaining PBT at a desired intrinsic viscosity. Such conventional production techniques for PBT are disclosed, for example, in U.S. Pat. No. 2,465,314, the contents of which are hereby incorporated by reference.

A preferred PBT resin is poly (1,4-butylene) terephthalate. A most preferred PBT resin is commercially available from Celanese Corporation, New York, N.Y., under the trade designation Celanex 2002. The PBT resin may comprise from about 52 to about 90, preferably from about 61 to about 85, and most preferably from about 69 to about 78, percent by weight based on the total weight of the molding composition of the present invention.

Carbon Fibers

The carbon fibers of the molding composition of the present invention contain at least about 90 percent carbon by weight and optionally may exhibit a predominantly graphitic x-ray defraction pattern. Preferably, the carbon fibers contain at least 93 percent carbon by weight. Graphitized carbon fibers commonly contain at least 95 percent carbon by weight.

The carbon fibers are provided as chopped lengths of fibers having lengths between about 0.1 and about 1.0 inch, preferably between about 0.1 and about 0.5 inch, and most preferably between about 0.2 and about 0.4 inch. However, the chopped fibers may be present in the form of multifilamentary bundles such as yarns, tows, and strands. Suitable carbon fibers are commercially available and commonly are of a relatively low dernier per filament of approximately 0.5 to 2. Furthermore, to improve the adhesion of the carbon fibers to the PBT resin and the handleability of the carbon fibers without undue fiber damage during the formation of composite articles, a flexible size or finish is applied to the surface of the carbon fibers. Suitable sizes and techniques for their application are disclosed in, e.g., U.S. Pat. Nos. 3,914,504; 3,957,716; and 4,364,993, the contents of which are hereby incorporated by reference.

The carbon fibers may be formed in accordance with a variety of techniques as will be apparent to those skilled in the art. For instance, organic polymeric fibrous materials which are capable of undergoing thermal stabilization may be initially stabilized by treatment in an appropriate atmosphere at a moderate temperature (e.g., 200° to 400° C.), and subsequently heated in a non-oxidizing atmosphere at a more highly elevated temperature, e.g., 900° to 1400° C., or more, until a carbonaceous fibrous material is formed. If the fibrous material following such heating at 900° to 1400° C. is heated to a maximum temperature of 2,000° to 3,100° C. (preferably 2,400° to 3,100° C.) in non-oxidizing atmosphere, substantial amounts of graphitic carbon are commonly detected in the resulting carbon fiber.

The exact temperature and atmosphere utilized during the initial stabilization of an organic polymeric fibrous material commonly vary with the composition of the precursor as will be apparent to those skilled in the art. During the carbonization reaction elements present in the fibrous material other than carbon (e.g. oxygen, nitrogen and hydrogen) are substantially expelled. Suitable organic polymeric fibrous materials from which the fibrous material capable of undergoing carbonization may be derived include an acrylic polymer, a cellulosic polymer, a polyamide, a polybenzimidazole, a polyvinyl alcohol, pitch, etc. Acrylic polymeric materials are particularly suited for use as precursors in the formation of carbonaceous fibrous materials. Illustrative examples of suitable cellulosic materials include the natural and regenerated forms of cellulose, e.g. rayon. Illustrative examples of suitable polyamide materials include the aromatic polyamides, such as nylon 6T, which is formed by the condensation of hexamethylene diamine and terephthalic acid. An illustrative example of a suitable polybenzimidazole is poly-2,2'-m-phenylene-5,5'-bibenzimidazole. Suitable pitch base fibers may be derived from petroleum or coal tar pitch.

A fibrous acrylic polymeric material prior to stabilization may be formed primarily of recurring acrylonitrile units. For instance, the acrylic polymer should be an acrylonitrile homopolymer or an acrylonitrile copolymer which contains at least 85 mole percent of recurring acrylonitrile units with not more than about 15 mole percent of a monovinyl compound which is copolymerizable with acrylonitrile such as styrene, methyl acrylate, methyl methacylate, vinyl acetate, vinyl chloride, vinylidene chloride, vinyl pyridine, and the like, or a plurality of such monovinyl compounds. In this context the term "copolymer" includes terepolymers, quadpolymers etc.

During the formation of a preferred carbon fibrous material for use in the present invention may be initially stabilized in an oxygen-containing atmosphere (i.e., preoxidized) on a continuous basis. See, for the instance, commonly assigned U.S. Pat. No. 3,539,295. The stabilized acrylic fibrous material which is preoxidized in an oxygen-containing atmosphere is black in appearance, contains a bound oxygen content of at least about 7 percent by weight as determined by the Unterzaucher analysis, retains its original fibrous configuration essentially intact, and is non-burning when subjected to an ordinary match flame.

Suitable techniques for transforming a stabilized acrylic fibrous material into a carbonaceous fibrous material are disclosed in commonly assigned U.S. Pat. Nos. 3,775,520; 3,818,682; 3,900,556; and 3,954,950, the contents of which are hereby incorporated by reference.

In accordance with a particularly preferred carbonization and graphitization technique a continuous length of stabilized acrylic fibrous material which is non-burning when subjected to an ordinary match flame and derived from an acrylic fibrous material selected from the group consisting of an acrylonitrile homopolymer and acrylonitrile copolymers which contain at least about 85 percent of acrylonitrile units and up to about 15 mole percent of one or more monovinyl units copolymerized therewith is converted to a graphite fibrous material while preserving the original fibrous configuration essentially intact while passing through a carbonization/graphitization heating zone containing a non-oxidizing gaseous atmosphere and a temperature gradient in which the fibrous material is raised within a period of about 20 to about 300 seconds from about 800° C. to a temperature of about 1,600° C. to form a continuous length of carbonized fibrous material and in which the carbonized fibrous material is subsequently raised from about 1,600° C. to a maximum temperature of at least about 2,400° C. within a period of about 3 to 300 seconds where it is maintained for about 10 seconds to about 200 seconds to form a continuous length of graphitic fibrous material.

The equipment utilized to produce the heating zone used to produce the carbonaceous starting material may be varied as will be apparent to those skilled in the art. It is essential that the apparatus selected be capable of producing the required temperature while excluding the presence of an oxidizing atmosphere.

In a preferred technique the continuous length of fibrous material undergoing carbonization is heated by use of a tubular resistance heated furnace. In such a procedure the fibrous material may be passed in the direction of its length through the tube of such furnace. For large scale production, it is of course preferred that relatively long tube furnaces be used so that the fibrous material may be passed through the same at a more rapid rate while being carbonized. The fibrous material because of its small mass and relatively large surface area instantaneously assumes substantially the same temperature as that of the zone through which it is continuously passed.

The carbonaceous fibrous material selected commonly possesses an average single filament Young's modulus of about 30 to 80 million psi, or more, depending largely upon the processing temperatures utilized during formation. Additionally, the carbonaceous fibrous material commonly exhibits an average single filament tensile strength of at least 200,000 psi, e.g. about 250,000 to 500,000 psi. The Young's modulus of the fiber may be determined by the procedure of ASTM Designation D-2343. The tensile strength may be determined by the procedure of ASTM Designation D-3379.

Antistatic Dopant

The thermoplastic molding composition of the present invention includes an antistatic dopant. The antistatic dopant comprises an electron acceptor compound, an electron donor compound, and a polytetrafluoroethylene resin.

The electron donor compound is preferably an aromatic halide, and is present in an amount of from about 4 to about 24, preferably from about 6 to about 20, and most preferably from about 10 to about 14.5 percent by weight of the total weight of the molding composition. Such aromatic halide compounds are well known to those skilled in the art, and include those aromatic halide compounds disclosed in U.S. Pat. Nos. 3,833,685; 4,010,219; and 3,751,396, the contents of which are hereby incorporated by reference. Examples of such compounds include decabromodiphenyl oxide, tetrabromophthalic anhydride, tetrachlorophthalic anhydride, 3,5,3',5'-tetrabromophthalic ether, 2,2',4,4',6,6'-hexachlorobiphenyl, decabromodiphenylether, octabromodiphenylether, hexabromodiphenylether, pentabromodiphenylether, tetrabromodiphenylether, tribromodiphenylether, dibromodiphenylether, hexachlorodiphenylether, pentachlorodiphenylether, tetrachlorodiphenylether, trichlorodiphenylether, and dichlorodiphenylether. Aromatic bromine compounds are preferred. Decabromodiphenyl oxide is most preferred.

The electron acceptor compound is present in an amount of from about 2 to about 12, preferably from about 3 to about 9, and most preferably from about 4 to about 7 percent by weight of the total weight of the molding composition. Group Va compounds are preferred; antimony (III) salts are most preferred. Such antimony compounds are well known to those skilled in the art and include these antimony compounds disclosed in U.S. Pat. No. 3,833,685, the content of which is incorporated by reference. Antimony trioxide is most preferred.

The polytetrafluoroethylene resin is present in an amount of from about 0.1 to about 2.0, preferably from about 0.2 to about 1.0, and most preferably from about 0.2 to about 0.5 percent by weight based on the total weight of the molding composition of the present invention. A preferred polytetrafluoroethylene resin is commercially available from E. I. DuPont de Nemours, Wilmington, Del., under the trade designation Teflon K.

The Molding Composition of the Present Invention

The molding compositions of this invention can be prepared by a number of procedures known to those skilled in the art. In one procedure, the carbon fibers are placed into an extrusion compounder with the other ingredients so as to produce molding pellets. The fibers are dispersed in a matrix of the PBT resin in the process. In another procedure, the carbon fibers are mixed with the PBT resin and other ingredients by dry blending, then either fluxed on a mill and comminuted, or extruded and chopped. The carbon fibers can also be mixed with powdered or granular constituents and directly injection molded. In a preferred embodiment, the carbon fibers are compounded into pellets of the PBT resin and the antistatic dopant. Compounding may be carried out on a single screw extended with the carbon fibers gently tumble blended with the pellets prior to extrusion compounding.

PBT resins are well known polyester molding resins. Aromatic halide compounds and antimony-containing compounds are known to form a so-called "synergistic" flame retardant for polyesters. See, e.g. U.S. Pat. No. 3,873,491. Polytetrafluoroethylene resins are known drip retardants for polyester resins. Further, carbon fiber is a known reinforcing agent for thermoplastic resins. However, it has been surprisingly discovered that a thermoplastic molding composition comprising an intimate blend of from about 52 to about 90 percent by weight of a PBT resin having an intrinsic viscosity of from about 0.7 to about 1.4 deciliters per gram measured in ortho-chlorophenol at 25° C. and at a PBT concentration of about 8% by weight, from about 6 to about 38 percent by weight of an antistatic dopant comprising an electron acceptor compound present in an amount of from about 2 to about 12 percent by weight of the total weight of the composition, an electron donor compound present in an amount of from about 4 to about 24 percent by weight of the total weight of the composition, and from about 0.1 to about 2.0 percent by weight of the total weight of the composition of polytetrafluoroethylene resin; and from about 4 to less than about 10 percent by weight of carbon fibers having lengths in the range of from about 0.1 to about 1.0 inches, exhibits a volume resistivity of less than $1 \times 10^8$ ohm-cm and surprisingly enhanced mechanical properties. That such a PBT resin molding composition is permanently antistatic is completely unexpected from known antistatic thermoplastic compositions. Furthermore, prior to the present invention, there was nothing in the prior art to suggest that the addition, within the aforedescribed parameters, of aromatic halogen compounds, an antimony compound, a polytetrafluoroethylene resin, and carbon fibers to PBT resins would result in a cost effective, low wear molding composition that exhibits a volume resistivity such that articles molded from the composition do not suffer from the deleterious buildup of a static electric charge. Finally, unlike prior thermoplastic molding compositions that contain carbon fibers, the components of the molding composition of the present invention are highly compatible and easily compounded into a homogeneous blend that is readily processed.

While not desirous of being constrained to any particular theory, it is believed that the antistatic dopant, that is the aforedescribed combination of an electron acceptor compound, an electron donor compound, and a polytetrafluoroethylene resin, "dope" the PBT resin matrix, and in conjunction with the addition of relatively low amounts of chopped carbon fibers, allow the composition to increase its potential for electrical conductivity and exhibit a surprising order of magnitude decrease in volume resistivity as compared to PBT resin compositions that include only relatively low levels of chopped carbon fibers, or that include only the antistatic dopant.

The following Examples are presented as specific illustrations of the invention. It should be understood, however, that the invention is not limited to the specific details set forth in the Examples.

EXAMPLE 1

The following compositions were compounded on a single screw 2½" Johnson extruder. All weight percents are based on the total weight of the compositions.

TABLE 1

| Composition | Poly (1,4 butylene) terephthalate[1] | Antimony trioxide | Decabromodiphenyl oxide | Teflon K | Carbon Fibers[2] |
|---|---|---|---|---|---|
| A | 100 | 0 | 0 | 0 | 0 |
| B | 93 | 0 | 0 | 0 | approx. 7 |
| C | 85.7 | 4.0 | 10.0 | 0.3 | 0 |
| D | 79.7 | 3.7 | 9.3 | 0.3 | approx. 7 |

[1]I.V. = 0.9 dl/gr measured in o-chlorophenol at 25° C. and at a PBT concentration of about 8% by weight.
[2]About 0.25 inches in length.

Each composition was evaluated for mechanical properties, wear, and electrical conductivity. Electrical conductivity was measured by volume resistivity according to ASTM-D257. Tensile strength and tensile percent elongation were measured by ASTM-D638. Flexural strength and flexural modulus were measured by ASTM-D790. Notched izod was measured by ASTM-D256. Time to wear failure was measured on a Faville-Levally Corp. LFW-6 thrust washer wear test machine. The results are detailed in Table 2.

TABLE 2

| Composition | Tensile Strength ($10^3$) psi | Tensile % Elongation | Flexural Strength ($10^3$) psi | Flexural Modulus ($10^5$) psi | Notched Izod (ft-lb/inch) | Volume Resistivity ohm-cm | Time to wear failure @ 300 ft/min. 50 psi (min.) |
|---|---|---|---|---|---|---|---|
| A | 8.4 | 5.9 | 15.1 | 4.4 | 0.56 | @ 500 V:1 × $10^{14}$ | 20 |
| B | 12.8 | 2.9 | 20.4 | 7.7 | 0.59 | @ 500 V:1 × $10^{14}$ | 120 |
| C | 8.8 | 19.0 | 14.5 | 4.3 | 0.52 | @ 500 V:1 × $10^{12}$ @ 100 V:1 × $10^{12}$ @ 50 V:1 × $10^{12}$ | 20 |
| D | 15.0 | 2.0 | 21.9 | 8.8 | 0.56 | @ 500 V:short @ 100 V:short @ 50 V:1 × $10^5$ | 120 |

As can be seen from Table 2, Composition D, a composition within the scope of the present invention, exhibits vastly improved wear resistance and mechanical properties as compared to compositions comprising only poly(1,4-butylene) terephthalate resin or poly(1,4-butylene) terephthalate resin, antimony trioxide, decabromodiphenyl oxide, and Teflon K, that is, Compositions A and C respectively. As compared to Composition B, Composition D shows a 17% improvement in tensile strength, a 31% improvement in tensile elongation, a 14% improvement in flexural modulus, and approximately equal resistance to wear, notched izod, and flexural strength characteristics.

At 500 V, Composition D is so conductive that it causes a short. In fact, the volume resistivity of Composition D cannot be measured until very low voltage is applied, i.e., 50 V, where the composition attains a volume resistivity of $1 \times 10^5$ ohm-cm. This is to be contrasted with the volume resistivity of Compositions A-C. At 500 V, the volume resistivity of these compositions is at least $1 \times 10^{12}$ ohm-cm. Furthermore, at lower voltages the volume resistivity would be equal to or greater than $1 \times 10^{12}$ ohm-cm. As a volume resistivity of less than $1 \times 10^8$ ohm-cm is necessary to alleviate the safety hazards associated with the buildup of a static electric charge on material handling equipment, these compositions are wholly unsuited for equipment that conveys or handles flammable or explosive material or sensitive electronic circuitry.

EXAMPLE 2

The following composition is compounded on a single screw 2½" Johnson extruder. All weight percents are based on the total weight of the composition.

TABLE 3

| Composition | Poly (1,4 butylene) terephthalate[1] | Antimony trioxide | Decabromodiphenyl oxide | Teflon K | Carbon Fibers[2] |
|---|---|---|---|---|---|
| E | 73 | 5 | 13.7 | 0.3 | 8 |

[1] I.V. = 0.9 dl/gr measured in o-chlorophenol at 25° C. and at a PBT concentration of about 8% by weight.
[2] About 0.25 inches in length.

Results similar to Example 1 would be expected.

Although the invention has been described with a preferred embodiment, it is to be understood that variations and modifications may be resorted to as will be apparent to those skilled in the art. Such variations and modifications are to be considered within the purview and scope of the claims appended hereto.

I claim:

1. A permanently antistatic, thermoplastic molding composition comprising an intimate blend of:
   (a) from about 52 to about 90 percent by weight based on the total weight of said molding composition of a polybutylene terephthalate resin having an intrinsic viscosity in the range of from about 0.7 to about 1.4 deciliters per gram measured in ortho-chlorophenol at 25° C. and at a polybutylene terephthalate concentration of about 8% by weight.
   (b) from about 6 to about 38 percent by weight based on the total weight of said molding composition of an antistatic dopant comprising:
      (i) an electron acceptor compound present in an amount of from about 2 to about 12 percent by weight of the total weight of said composition;
      (ii) an electron donor compound present in an amount of from about 4 to about 24 percent by weight of the total weight of said composition; and
      (iii) from about 0.1 to about 2.0 percent by weight based on the total weight of said composition of polytetrafluoroethylene resin; and
   (c) from about 4 to less than about 10 percent by weight based on the total weight of said molding composition of carbon fibers having lengths between about 0.1 and about 1.0 inch; wherein said molding composition has a volume resistivity of less than $1 \times 10^8$ ohm-cm.

2. The antistatic, thermoplastic molding composition of claim 1 wherein said polybutylene terephthalate resin is poly (1,4-butylene) terephthalate.

3. The antistatic, thermoplastic molding composition of claim 1 wherein said polybutylene terephthalate resin is poly (1,3-butylene) terephthalate.

4. The antistatic, thermoplastic molding composition of claim 1 wherein said polybutylene terephthalate resin is poly (1,2-butylene) terephthalate.

5. The antistatic, thermoplastic molding composition of claim 1 wherein said polybutylene terephthalate resin is poly (2,3-butylene) terephthalate.

6. The antistatic, thermoplastic molding composition of claim 1 wherein said electron donor compound is an aromatic halide selected from the group consisting of decabromodiphenyl oxide, decabromodiphenyl ether, octabromodiphenyl ether, pentabromoethyl benzene, hexabromobenzene, 2,2-bis-(3,5-dibromo-4-hydroxyphenyl) propane, tetrabromophthalic anhydride, octabromodiphenyl, decabromobiphenyl, and 3,5,3',5'-tetrabromobiphenyl ether.

7. The antistatic, thermoplastic molding composition of claim 6 wherein said aromatic halide is decabromodiphenyl oxide.

8. The antistatic, thermoplastic molding composition of claim 1 wherein said electron acceptor compound is an antimony (III) salt.

9. The antistatic, thermoplastic molding composition of claim 8 wherein said antimony (III) salt is antimony trioxide.

10. A permanently antistatic, thermoplastic molding composition comprising an intimate blend of:
    (a) from about 61 to about 85 percent by weight based on the total weight of said molding composition of a polybutylene terephthalate resin having an intrinsic viscosity in the range of from about 0.8 to about 1.1 deciliters per gram measured in ortho-chlorophenol at 25° C. and at a polybutylene terephthalate resin concentration of about 8% by weight;
    (b) from about 9 to about 30 percent by weight based on the total weight of said molding composition of an antistatic dopant comprising:
       (i) an electron acceptor compound present in an amount of from about 3 to about 9 percent by weight of the total weight of said molding composition;
       (ii) an electron donor compound present in an amount of from about 6 to about 20 percent by weight of the total weight of said molding composition; and
       (iii) from about 0.2 to about 1.0 percent by weight based on the total weight of said molding composition of polytetrafluoroethylene resin; and
    (c) from about 6 to about 9 percent by weight based on the total weight of said molding composition of carbon fibers having lengths between about 0.2 and about 0.4 inch; wherein said molding composition has a volume resistivity of less than $1 \times 10^8$ ohm-cm.

11. The antistatic, thermoplastic molding composition of claim 10 wherein said polybutylene terephthalate resin is poly (1,4-butylene) terephthalate.

12. The antistatic, thermoplastic molding composition of claim 10 wherein said polybutylene terephthalate resin is poly (1,3-butylene) terephthalate.

13. The antistatic, thermoplastic molding composition of claim 10 wherein said polybutylene terephthalate resin is poly (1,2-butylene) terephthalate.

14. The antistatic, thermoplastic molding composition of claim 10 wherein said polybutylene terephthalate resin is poly (2,3-butylene) terephthalate.

15. The antistatic, thermoplastic molding composition of claim 10 wherein said electron donor compound is an aromatic halide selected from the group consisting of decabromodiphenyl oxide, decabromodiphenyl ether, octabromodiphenyl ether, pentabromoethyl benzene, hexabromobenzene, 2,2-bis-(3,5-dibromo-4- hydroxyphenyl) propane, tetrabromophthalic anhydride, octabromodiphenyl, decabromobiphenyl, and 3,5,3',5',-tetrabromobiphenyl ether.

16. The antistatic, thermoplastic molding composition of claim 15 wherein said aromatic halide is decabromodiphenyl oxide.

17. The antistatic, thermoplastic molding composition of claim 10 wherein said electron acceptor compound is an antimony (III) salt.

18. The antistatic, thermoplastic molding composition of claim 17 wherein said antimony (III) salt is antimony trioxide.

19. A permanently antistatic, thermoplastic molding composition comprising an intimate blend of:
   (a) from about 69 to about 78 percent by weight based on the total weight of said molding composition of a polybutylene terephthalate resin having an intrinsic viscosity in the range of from about 0.8 to about 1.1 deciliters per gram measured in ortho-chlorophenol at 25° C. and at a polybutylene terephthalate resin concentration of about 8% by weight;
   (b) from about 15 to about 22 percent by weight based on the total weight of said molding composition of an antistatic dopant comprising:
      (i) an electron acceptor compound present in an amount of from about 4 to about 7 percent by weight of the total weight of said molding composition;
      (ii) an electron donor compound present in an amount of from about 10 to about 14.5 percent by weight of the total weight of said molding composition; and
      (iii) from about 0.2 to about 0.5 percent by weight based on the total weight of said molding composition of polytetrafluoroethylene resin; and
   (c) from about 7 to about 9 percent by weight based on the total weight of said molding composition of carbon fibers having lengths between about 0.2 and about 0.4 inch; wherein said molding composition has a volume resistivity of less than $1 \times 10^8$ ohm-cm.

20. The antistatic, thermoplastic molding composition of claim 19 wherein said polybutylene terephthalate resin is poly (1,4-butylene) terephthalate.

21. The antistatic, thermoplastic molding composition of claim 19 wherein said polybutylene terephthalate resin is poly (1,3-butylene) terephthalate.

22. The antistatic, thermoplastic molding composition of claim 19 wherein said polybutylene terephthalate resin is poly (1,2-butylene) terephthalate.

23. The antistatic, thermoplastic molding composition of claim 19 wherein said polybutylene terephthalate resin is poly (2,3-butylene) terephthalate.

24. The antistatic, thermoplastic molding composition of claim 19 wherein said electron donor compound is an aromatic halide selected from the group consisting of decabromodiphenyl oxide, decabromodiphenyl ether, octabromodiphenyl ether, pentabromoethyl benzene, hexabromobenzene, 2,2-bis-(3,5-dibromo-4-hydroxyphenyl) propane, tetrabromophthalic anhydride, octabromodiphenyl, decabromobiphenyl, and 3,5,3',5',-tetrabromobiphenyl ether.

25. The antistatic, thermoplastic molding composition of claim 24 wherein said aromatic bromine is decabromodiphenyl oxide.

26. The antistatic, thermoplastic molding composition of claim 19 wherein said electron acceptor compound is an antimony (III) salt.

27. The antistatic, thermoplastic molding composition of claim 26 wherein said antimony (III) salt is antimony trioxide.

28. A permanently antistatic, thermoplastic molding composition comprising an intimate blend of:
   (a) from about 69 to about 78 percent by weight based on the total weight of said molding composition of poly (1,4-butylene) terephthalate having an intrinsic viscosity in the range of from about 0.4 to about 1.0 deciliters per gram measured in ortho-chlorphenol at 25° C. and at a poly(1,4-butylene) terephthate concentration of about 8% by weight;
   (b) from about 15 to about 22 percent by weight based on the total weight of said molding composition of an antistatic dopant comprising:
      (i) antimony trioxide present in an amount of from about 4 to about 7 percent by weight of the total weight of said molding composition;
      (ii) decabromodiphenyl oxide present in an amount of from about 10 to about 14.5 percent by weight of the total weight of said molding composition; and
      (iii) from about 0.2 to about 0.5 percent by weight based on the total weight of said molding composition of polytetrafluoroethylene; and
   (c) from about 7 to about 9 percent by weight based on the total weight of said molding composition of carbon fibers having lengths between about 0.2 and about 0.4 inch; wherein said molding composition has a volume resistivity of less than $1 \times 10^8$ ohm-cm.

* * * * *